(12) United States Patent
Ofir et al.

(10) Patent No.: US 10,477,490 B2
(45) Date of Patent: Nov. 12, 2019

(54) MITIGATING INTER-DEVICE INTERFERENCE USING CLOUD-BASED POLICY

(71) Applicant: MOTOROLA SOLUTIONS, INC., Chicago, IL (US)

(72) Inventors: Gabi Ofir, Reshon Letzion (IL); Eitan Koren, Herzeliya (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 155 days.

(21) Appl. No.: 15/693,183

(22) Filed: Aug. 31, 2017

(65) Prior Publication Data

US 2019/0069252 A1    Feb. 28, 2019

(51) Int. Cl.
*H04B 15/00* (2006.01)
*H04W 52/24* (2009.01)
*H04B 1/40* (2015.01)
*H04L 29/06* (2006.01)
*H04L 29/08* (2006.01)
(Continued)

(52) U.S. Cl.
CPC ............ *H04W 52/243* (2013.01); *H04B 1/40* (2013.01); *H04L 69/18* (2013.01); *H04B 1/1027* (2013.01); *H04B 15/005* (2013.01); *H04L 67/10* (2013.01); *H04W 72/005* (2013.01); *H04W 72/082* (2013.01)

(58) Field of Classification Search
None
See application file for complete search history.

(56) References Cited

U.S. PATENT DOCUMENTS

| 8,010,102 B2 * | 8/2011 | Glick | H04B 1/0003 |
| | | | 455/41.2 |
| 9,167,588 B1 * | 10/2015 | Joshi | H04W 72/082 |

(Continued)

FOREIGN PATENT DOCUMENTS

WO    2015/061984    5/2015

OTHER PUBLICATIONS

GB1812597.1 Combined Search and Examination Report dated Jan. 31, 2019 (2 pages).

*Primary Examiner* — Tuan A Tran
(74) *Attorney, Agent, or Firm* — Michael Best & Friedrich LLP

(57) ABSTRACT

An inter-device interference mitigation system, method, and device. The device includes a first transceiver, a second transceiver, and an electronic processor. The electronic processor is configured to receive an interference policy and receive information from a second electronic communications device to determine an interference potential. The electronic processor compares the interference potential to a predetermined interference threshold. When the interference potential exceeds the predetermined interference threshold, the electronic processor performs at least one action selected from the group consisting of adjusting a power output of the first transceiver, generating a user notice including instructions to move or adjust an operation of either one or both of the electronic communications device and the second electronic communications device, affecting an operation of an application present on either one or both of the electronic communications devices, and modifying a transmission of either one or both of the electronic communications devices.

18 Claims, 4 Drawing Sheets

(51) Int. Cl.
  *H04W 72/00* (2009.01)
  *H04W 72/08* (2009.01)
  *H04B 1/10* (2006.01)

(56) References Cited

U.S. PATENT DOCUMENTS

| | | | | |
|---|---|---|---|---|
| 9,497,770 | B2* | 11/2016 | Wilkinson | H04W 72/1226 |
| 9,521,580 | B1* | 12/2016 | Wurtenberger | H04W 72/0446 |
| 9,591,124 | B2* | 3/2017 | Corretjer | H04M 3/2227 |
| 9,781,735 | B2* | 10/2017 | Comsa | H04W 72/1215 |
| 10,129,763 | B1* | 11/2018 | Bui | H04W 4/90 |
| 10,129,768 | B1* | 11/2018 | Azem | H04W 24/02 |
| 10,178,664 | B1* | 1/2019 | Mansour | H04W 72/044 |
| 2009/0131067 | A1 | 5/2009 | Aaron | |
| 2010/0220686 | A1* | 9/2010 | Glick | H04B 1/0003 |
| | | | | 370/330 |
| 2014/0177483 | A1* | 6/2014 | Jones | H04L 5/14 |
| | | | | 370/278 |
| 2015/0148088 | A1* | 5/2015 | Ericson | H04B 15/00 |
| | | | | 455/501 |
| 2015/0223111 | A1 | 8/2015 | Lindoff et al. | |

* cited by examiner

MITIGATING INTER-DEVICE INTERFERENCE USING CLOUD-BASED POLICY

BACKGROUND OF THE INVENTION

Different wireless communications devices, for example radios, computers, tablets, and cellular telephones, may operate using different communication protocols or technologies. For example, mobile communications devices may operate using or be compatible with land-mobile radio (LMR), long-term evolution (LTE), Code Division Multiple Access (CDMA), Time Division Multiple Access (TDMA), Evolution-Data Optimized (EV-DO), Enhanced Data Rates for GSM Evolution (EDGE), 3G, 4G, Wireless Fidelity (Wi-Fi), and Bluetooth protocols or combinations of those protocols.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed subject matter, and explain various principles and advantages of those embodiments.

Figure 1:
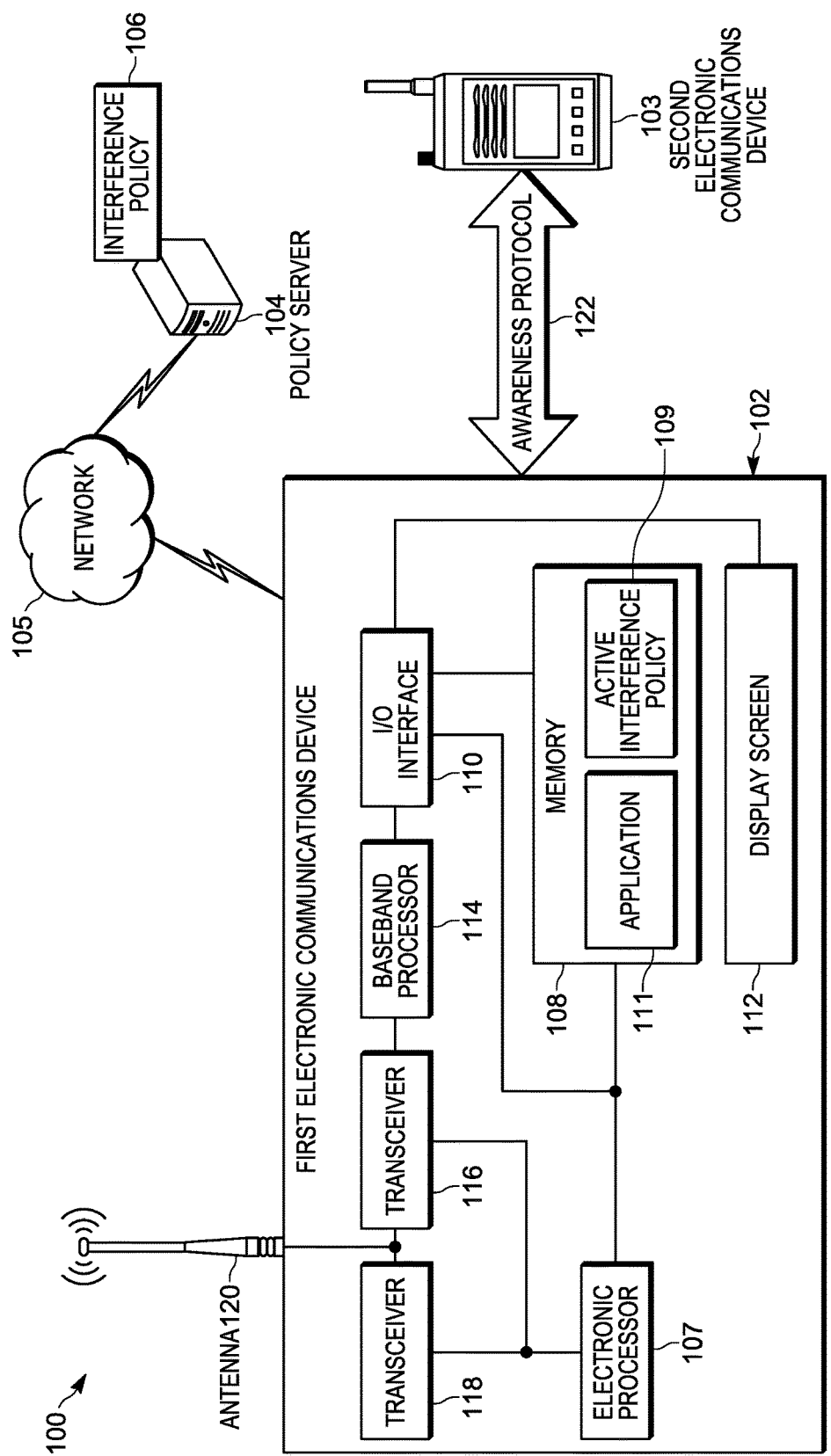
FIG. 1 is a diagram of a multi-device communications system in accordance with some embodiments.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION OF THE INVENTION

When multiple communication devices utilizing different communication protocols operate in proximity to one another, or when a single communication device utilizes more than one communication protocol (for example, while utilizing more than one transceiver simultaneously), radio frequency interference may occur. The quality of service or performance of the device(s) may suffer as a result.

One embodiment described herein provides an electronic communications device including a first transceiver, a second transceiver and an electronic processor connected to the first transceiver and the second transceiver. The electronic processor is configured to receive an interference policy and receive, via the second transceiver, information from a second electronic communications device. The electronic processor is configured to determine, based on the information, an interference potential between the electronic communications device and the second electronic communications device, compare the interference potential to a predetermined interference threshold, and, in response to the interference potential exceeding the predetermined interference threshold, perform at least one action according to the interference policy. The at least one action is selected from the group consisting of adjusting a power output of the first transceiver, generating a user notice including instructions to move or adjust an operation of either one or both of the electronic communications device and the second electronic communications device, affecting an operation of an application present on either one or both of the electronic communications device and the second electronic communications device, and modifying a transmission of either one or both of the electronic communications device and the second electronic communications device.

Another embodiment provides a method of mitigating inter-device interference on an electronic communications device. The method includes receiving an interference policy, receiving, via a second transceiver, information from a second electronic communications device, and determining, based on the information and with an electronic processor of the electronic communications device, an interference potential between the electronic communications device and the second electronic communications device. The method further includes comparing, via the electronic processor, the interference potential to a predetermined interference threshold, and, in response to the interference potential exceeding the predetermined interference threshold, performing, with the electronic processor, at least one action according to the interference policy, the at least one action selected from the group consisting of adjusting a power output of the first transceiver, generating a user notice including instructions to move or adjust an operation of either one or both of the electronic communications device and the second electronic communications device, affecting an operation of an application present on either one or both of the electronic communications device and the second electronic communications device, and modifying a transmission of either one or both of the electronic communications device and the second electronic communications device.

Another embodiment provides an inter-device interference mitigation system. The system includes an electronic communications device and a server configured to store an interference policy and transmit the interference policy to the electronic communications device. The electronic communications device includes a first transceiver, a second transceiver, and an electronic processor connected to the first transceiver and second transceiver. The electronic processor is configured to receive the interference policy, receive, via the second transceiver, information from a second electronic communications device, and determine, based on the information, an interference potential. The electronic processor is further configured to compare the interference potential to a predetermined interference threshold and, in response to the interference potential exceeding the predetermined interference threshold, perform at least one action according to the interference policy, the at least one action selected from the group consisting of adjusting a power output of the first transceiver, generating a user notice including instructions to move or adjust an operation of either one or both of the electronic communications device and the second electronic communications device, affecting an operation of an application present on either one or both of the electronic communications device and the second electronic communications device, and modifying a transmission of either one or both of the electronic communications device and the second electronic communications device.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components. For example, the systems and the methods are described in terms of only a first and a second electronic communications device. It should be understood that, in some embodiments, the systems and methods may include additional electronic communications devices.

It should be understood that the systems and methods described herein may also be applied to a converged communication device that includes at least a first transceiver module and a second transceiver module. The first transceiver module and the second transceiver module may each execute one or more different protocols (in one example, the first transceiver module is configured for LMR and the second transceiver module is configured for LTE.) The first transceiver module and the second transceiver module communicating with each other at an application level within a converged device may be considered analogous to the first electronic communications device and the second electronic communications device and perform similar functions and methods described herein. Thus, references herein to the first electronic communications device and the second electronic communications device are intended to cover embodiments in a converged device where there are first and second transceiver modules.

FIG. 1 is a block diagram of a communications system 100 for providing wireless communication. In the example illustrated, the communications system 100 includes a first electronic communications device 102, a second electronic communications device 103, and a policy server 104 communicatively coupled to the first electronic communications device 102 via a network 105. In some embodiments, the second electronic communications device 103 is also communicatively coupled to the policy server 104, for example via the network 105. In a number of the embodiments described herein, the first electronic communications device 102 is a smart telephone and the second electronic communications device 103 is a portable two-way radio. However, the systems and methods described herein are not limited to this configuration. In view of the description below, some embodiments described herein may be implemented using different types of electronic devices such as, for example, cellular telephones, smart watches, tablet computers, personal digital assistants (PDAs), or other devices that include or are capable of being coupled to a network interface or other components to enable wireless network communications.

The policy server 104 is a computer server or other computing device (including, for example, a computing device including a processor, memory, and communications interface). The policy server 104 includes hardware and software that enables a user of the policy server 104 to send and receive commands, queries, and other data to and from at least the first electronic communications device 102 via the network 105. As described in detail below, the policy server 104 sends and receives an interference policy 106 to and receives information from the first electronic communications device 102. The interference policy 106 (along with other interference policies) may be stored, in a memory or database local to the policy server 104. In some embodiments, interference policy 106 may be stored on a remote or cloud database and retrieved by the policy server 104. In further embodiments, the policy server 104 may also communicate with the second electronic communications device 103 via the network 105 in one or more methods similar to those described herein in regard to the first electronic communications device 102.

In the example illustrated, the first electronic communications device 102 includes an electronic processor 107, a memory 108, an input/output (I/O) interface 110, a display screen 112, a baseband processor 114, a first transceiver 116, a second transceiver 118, and an antenna 120. For ease of description, the embodiment of the first electronic communications device 102 illustrated in FIG. 1 includes one of each of the foregoing components. Alternative embodiments may include more or fewer of each of these components, may combine some components, or may include other alternative components. For example, some embodiments include components that perform distinct functions, for example, a transmitter and a receiver, instead of, or in addition to, the first and/or second transceiver 116 and 118. Other embodiments may include components, for example, a transmitter and a receiver (not shown) that operate to establish short-range wireless (for instance, Bluetooth), Wi-Fi, or other wireless connections with other electronic devices or wireless data networks.

The electronic processor 107, the memory 108, the input/output interface 110, the baseband processor 114, the first transceiver 116, the second transceiver 118, and the antenna 120, as well as other various modules and components, are electrically coupled to each other by or through one or more control or data buses, which enable communication therebetween. The electronic processor 107 operates to control the other components of the first electronic communications device 102. The electronic processor 107 obtains and provides information (for example, from the memory 108 and/or the input/output interface 110), and processes the information by executing one or more software instructions or modules, capable of being stored, for example, in a random access memory ("RAM") area of the memory 108 (for example, during execution) or a read only memory ("ROM") of the memory 108 (for example, on a generally permanent basis) or another non-transitory computer readable medium. The software can include firmware, one or more applications, program data, filters, rules, one or more program modules, and other executable instructions. The electronic processor 107 retrieves from the memory 108 and executes, among other things, software related to the control processes and methods described herein, for example an active interference policy 109.

The memory 108 can include one or more non-transitory computer-readable media, and includes a program storage area and a data storage area. The program storage area and the data storage area can include combinations of different types of memory, as described herein. In some embodiments, the memory 108 includes one or more software applications 111. One or more of the applications 111 may cause the electronic processor 107 to utilize the first and/or second transceiver 116 and 118 to communicate with one or more remote electronic devices and/or servers (for example, the second electronic communications device 103).

The input/output interface 110 operates to receive input from, for example, a user of the first electronic communications device 102, to provide system output, or a combination of both. The input/output interface 110 obtains information and signals from, and provides information and signals to, (for example, over one or more wired and/or wireless connections) devices both internal and external to the first electronic communications device 102. Input may be provided via, for example, a keypad, a microphone, soft keys, icons, or soft buttons on the display screen 112, a scroll ball, buttons, and the like. System output may be provided via the display screen 112. The display screen 112 is a suitable display device such as, for example, a liquid crystal display (LCD) touch screen, or an organic light-emitting diode (OLED) touch screen. The input/output interface 110 may include a graphical user interface (GUI) (for example, generated by the electronic processor 107, from instructions and data stored in the memory 108, and presented on the display screen 112) that enables a user to interact with the first electronic communications device 102. In alternative embodiments, the input/output interface 110 includes a push-to-talk (PTT) button for activating a two-way radio modem (not shown), which button may be implemented, for example, as a physical switch or by using a soft key or icon in the graphical user interface on the display screen 112. In some embodiments, the input/output interface 110 may include a speaker (not shown) to provide an audible system output.

The baseband processor 114 operates to encode and decode digital data sent and received by the first transceiver 116 and the second transceiver 118. The electronic processor 107 controls the first transceiver 116 and the second transceiver 118 to send and receive data to and from various wireless communications and data networks such as, for example, a long-term evolution cellular network (not shown), via the antenna 120. In one exemplary embodiment, the first transceiver 116 is configured to send and receive data to and from the network 105 and the second transceiver 118 is configured to send and receive data to and from the second electronic communications device 103.

In one exemplary embodiment, the first electronic communications device 102 is configured to perform a variety of functions, accessible via components including the input/output interface 110 and the display screen 112. The functions include, for example, running local or network-based applications ("apps"), providing access to remote data networks (for example, using the long-term evolution (LTE) protocol), and providing wireless voice communications using one or more modalities (for example, land-mobile radio or cellular).

The second electronic communications device 103 includes hardware and software that provide the capability for the second electronic communications device 103 to communicate wirelessly. In the illustrated embodiment, the second electronic communications device 103 is a portable two-way radio, for example, one of the Motorola® APX™ series of radios. In one exemplary embodiment, the second electronic communications device 103 operates to communicate wirelessly using, for example, a public safety land-mobile radio (LMR) network (not shown), which may be, for example, implemented in accordance with the Association of Public Safety Communications Officials (APCO) "Project 25" (P25) two-way radio communications protocol. In alternative embodiments, the second electronic communications device 103 may operate using other two-way radio communications protocols and standards. As noted above, in alternative embodiments, the second electronic communications device 103 may be a cellular telephone, a smart telephone, or other electronic communications device.

In some embodiments, the first electronic communications device 102 and the second electronic communications device 103 operate to communicate with each other via an awareness protocol 122 established over a short range wireless communication link. The awareness protocol 122, described in more detail below, allows the first and second electronic communications devices 102 and 103 to mitigate or avoid interference during operation. In some embodiments, the first and second electronic communications devices 102 and 103 communicate according to the awareness protocol 122 via data link. The data link is a wireless connection established using, for example, a Wi-Fi, Bluetooth, short-range wireless, or near field communication modality. In some embodiments, the awareness protocol 122 utilizes a shared memory accessible by both the first and second electronic communications devices 102 and 103. For example, when the first and second electronic communications devices 102 and 103 are transceiver modules within a converged device, the devices 102 and 103 may access the same memory.

The first electronic communications device 102 and the second electronic communications device 103 operate wirelessly within particular frequency bands or ranges. Therefore, it is possible for both the first electronic communications device 102 and the second electronic communications device 103 to operate in the proximate frequency bands (or the same frequency band) at the same time. For example, the first electronic communications device 102 may operate using the long-term evolution (LTE) protocol in the 700 MHz long-term evolution frequency band, while the second electronic communications device 103 operates in the 700 MHz land-mobile radio frequency band. It should be understood that the systems and methods described herein could be used to reduce radio frequency interference with any frequency ranges.

When first electronic communications device 102 and the second electronic communications device 103 operate in the same frequency range and in physical proximity to one another, for example, in the same vehicle or on the same public safety utility belt, radio frequency interference may result. The operating frequencies of the first electronic communications device 102 and the second electronic communications device 103 need not be exactly the same for interference to result. For example, the performance of a transceiver of the second electronic communications device 103 may be diminished by effects caused by the transmissions of the first electronic communications device 102, such as, for example, intermodulation interference, out of band emissions, and radio frequency saturation. When the radio frequency interference is severe enough, the second electronic communications device 103 may not be able to connect to, or communicate with, its affiliated land-mobile radio network. Accordingly, using the methods described below, the first electronic communications device 102 and the second electronic communications device 103 operate to detect the potential for radio frequency interference and attempt to mitigate the interference. The interference potential is or provides, in some examples, a degree interference being presently experienced by either one or both of the first electronic communications device 102 and the second electronic communications device 103 or the likelihood that either one or both of the first electronic communications device 102 and the second electronic communications device 103 will experience a degree of radio frequency interference.

Figure 2:
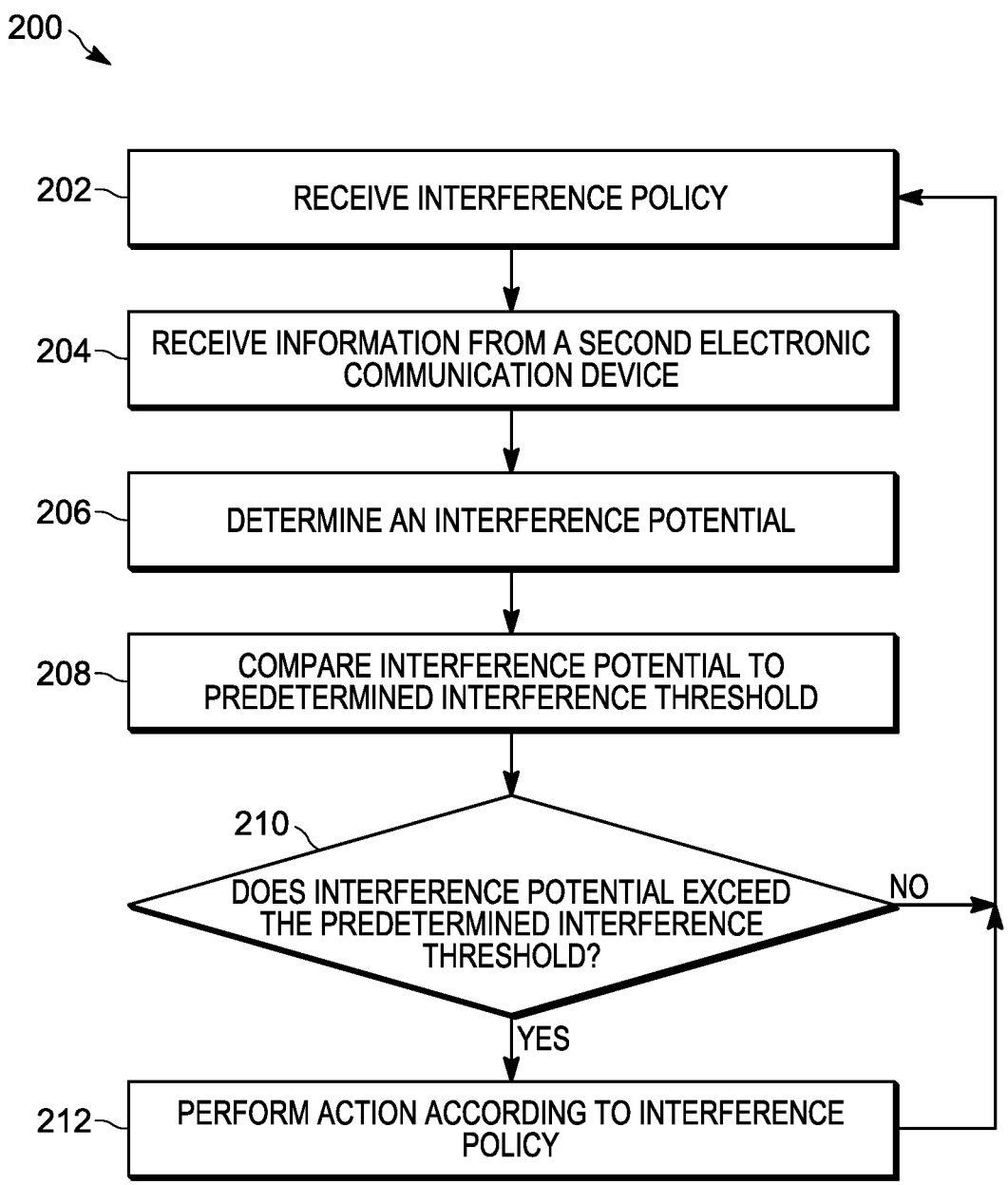
FIG. 2 is a flow chart of a method for mitigating device interference with the multi-device communication system of FIG. 1 in accordance with some embodiments.

FIG. 2 illustrates an exemplary method 200 of mitigating inter-device interference on an electronic communications device. As an example, the method 200 is described in terms of the first electronic communications device 102 being a smart telephone used by a law enforcement officer, and the second electronic communications device 103 being a portable two-way radio used by the same law enforcement officer. In this example, the first electronic communications device 102 operates using the long-term evolution wireless modality, and the second electronic communications device 103 operates using the land-mobile radio wireless modality. This should not be considered limiting; the concepts embodied in the example described may be applied to different scenarios, combinations of devices, and devices that operate according to different protocols or modalities than those explicitly explained. For example, the first electronic communications device 102 may be a portable two-way radio used by a first law enforcement officer, and the second electronic communications device 103 may be a smart telephone used by a second law enforcement officer working in the same vehicle as the first law enforcement officer (or in the same general vicinity). It should also be understood that while the method 200 is described as being implemented on the electronic processor 107 of the first electronic communications device 102, some or all of the method 200 may also be implemented on the second electronic communications device 103. The second electronic communications device 103 may also implement the method 200 in parallel to the first electronic communications device 102 implementing the method 200.

At block 202, the electronic processor 107 receives the interference policy 106. The interference policy 106 may be received, via the first transceiver 116, from a remote server (for example, the policy server 104). In some embodiments, the interference policy 106 is received, via the second transceiver 118, from the second electronic communications device 103. The interference policy 106 received by the first electronic communications device 102 may be stored in the memory 108 as the active interference policy 109. The interference policy 106 may be determined based on one or more characteristics of one or more of the electronic communications devices of the communications system 100 (for example, as illustrated in FIG. 1, either or both of the first and the second electronic communications devices 102 and 103). In some embodiments, the first electronic communications device 102 is configured to initially download the interference policy 106 from a code plug or other configurable flash memory that is not part of the firmware of the first electronic communications device 102. In some embodiments, when the first and second electronic communications devices 102 and 103 are transceiver modules within a converged device, the active interference policy 109 may be stored in a shared memory accessible to both devices 102 and 103.

The characteristics may be transmitted to the policy server 104 via either or both of the first and second electronic communications devices 102 and 103 via the network 105. In some embodiments the characteristics are shared between the first electronic communications device 102 and the second electronic communications device 103. The characteristics transmitted are according to the awareness protocol 122.

The one or more characteristics may include, for example, a message type or a purpose of the message(s) transmitted by the electronic communications device 102, 103 are for. For example, the messages may be defined for a personal area network, for service routing, for authentication, and so on. In some embodiments, the message type may be a radio frequency co-existence type. In such embodiments, the radio frequency co-existence type may exclusively include information necessary for determining an interference policy 106 to be the active interference policy 109.

In some embodiments, the one or more characteristics may include an awareness protocol state. The awareness protocol state indicates a communication state of the electronic communications devices 102, 103. The communication state may be based on which block (block 202, 204, 206, 208, 210, or 212) of the method 200 is being performed presently on the first and second electronic communications device 102, 103. The communication state may be an initial state (immediately after the electronic communications device 102, 103 powers up), an idle state (no interference has been determined on the electronic communications device 102, 103), an interference likelihood (after the first and second electronic communications device 102, 103 has determined its own probability of experiencing interference), and an action state (performing one or more actions associated with an active interference policy 109 on the first and second electronic communications device 102, 103).

In some embodiments, the one or more characteristics include an interference policy version. The interference policy version indicates the active interference policy 109, if any, presently stored and active on the electronic communications device 102, 103. This may be to ensure that both the first and the second electronic communications device 102, 103 are implementing the same interference policy 106 as set forth according to the active interference policy 109 of the communications system 100.

In some embodiments, the one or more characteristics include an interference status. The interference status is a degree of interference measured/determined by the electronic communications device 102, 103 that the electronic communications device 102, 103 is experiencing. The interference status may be determined by the electronic communications device 102, 103 in a way similar to the method described at block 206 (see below). In some embodiments, the severity of interference (for example, constant, periodic, or temporal) may define different actions to be taken as defined by the active interference policy 109 (see block 212).

In some embodiments, the one or more characteristics include an action level. The action level determines a degree of action able to be performed by the electronic communications device 102, 103. The action level may include information regarding the ability of the electronic communications device 102, 103 to modify its transmission technology type, transmission frequency, transmission duration, transmission type, transmission content type, and destination of the transmission. The action level, for example, may indicate a limit or range in which the electronic communications device 102, 103 may adjust its transmission frequency or transmitting power or what other communication cells it may switch to. The action level may also include the level or degree of action presently being performed by the electronic communications device 102, 103 according to the active interference policy 109 presently on the electronic communications device 102, 103.

In some embodiments, the one or more characteristics include a transmission mode of the electronic communications device 102, 103. The transmission mode may be continuous, slotted, random access, and so on. In some embodiments, the one or more characteristics include a modulation type of the electronic communications device 102, 103. The modulation type is the kind of modulation of the transmissions of the electronic communications device 102, 103. For example, the modulation type may be a Quadrature Phase Shift Keying (QPSK) type, a Differential Quadrature Phase Shift Keying (DQPSK) type, a Frequency-Shift Keying (FSK) type, a Quadrature Amplitude Modulation (QAM) type, and any other kind of modulation.

In some embodiments, the one or more characteristics include a received signal strength indication of the electronic communications device 102, 103. The received signal strength indication is the level of power received by the electronic communications device 102, 103.

In some embodiments, the one or more characteristics include a radio technology type. The radio technology type is the type of radio/wireless communication protocol used by the electronic communications device 102, 103, for example, one or more of 2G, 3G, 4G, 5G, and LTE protocols.

In some embodiments, the one or more characteristics include a radio mode of the electronic communications device 102, 103 (for example, a normal or emergency mode).

In some embodiments, the one or more characteristics include a priority level of the electronic communications device 102, 103. The priority level is used to determine, out of the electronic communications devices 102, 103 of the communications system 100, an order of which communication is most critical. The priority of the electronic communications device 102, 103 may be used to determine one or more corresponding actions defined by the interference policy 106 received by the electronic processor 107 at block 202.

In some embodiments, the one or more characteristics include one or more time stamps for transmissions transmitted from and received by the electronic communications device 102, 103. In some embodiments, the one or more characteristics include a time interval or a duration in which transmissions of the electronic communications device 102, 103 are sent. In some embodiments, the time stamp characteristics include the periodicity of messages related to the awareness protocol 122.

In some embodiments, the one or more characteristics include an operation mode of the electronic communications device 102, 103. For example, the operation mode may be a trunking operation, conventional operation, or a direct mode operation.

In some embodiments, the one or more characteristics include an identity of the electronic communications device 102, 103. The identity may be a private or personal identity of the electronic communications device 102, 103. In some embodiments, the identity is of a group of electronic communications devices that the electronic communications device 102, 103 is part of. In some embodiments, the identity of the electronic communications device 102, 103 may be used to determine the priority level (as described above) of the electronic communications device 102, 103.

In some embodiments, the one or more characteristics include an IP address of the electronic communications device 102, 103. In some embodiments, the identity of the electronic communications device 102, 103 may be used to determine the priority level (as described above) of the electronic communications device 102, 103. In further embodiments, the one or more characteristics include a downlink (DL) service type (whether the transmission is idle, continuous, slotted, in a sleep mode and so on).

In some embodiments, the one or more characteristics include a service engagement type. The service engagement type is what type of service the electronic communications device 102, 103 is performing, for example, signaling, voice, video, and the like.

In some embodiments, the one or more characteristics include a radio phase of the electronic communications device 102, 103. The radio phase may be, for example, whether the electronic communications device 102, 103 is searching for a suitable communication network for transmission or a level of network camping of the electronic communications device 102, 103.

At block 204, the electronic processor 107 receives, via the second transceiver 118, information from the second electronic communications device 103 and determines, based on the information, an interference potential (block 206). The interference potential is or provides, in some examples, a degree interference being presently experienced by either one or both of the first electronic communications device 102 and the second electronic communications device 103 or the likelihood that either one or both of the first electronic communications device 102 and the second electronic communications device 103 will experience a degree of radio frequency interference.

Specifically, the first electronic communications device 102 receives information regarding the transmission behavior of the second electronic communications device 103. The information may include, for example, a multicast control channel frequency, a multicast control channel duplex spacing, a traffic channel frequency, and/or a traffic channel duplex spacing. In some embodiments, the information includes a type of interference determined by the second electronic communications device 103. The type of interference may be an out-of-band emission (OOBE), intermodulation, blocking, and the like.

In some embodiments, the second electronic communications device 103 may further include an accelerometer (not shown). In such an embodiment, the information received by the electronic communications device 102 further includes an accelerometer pattern measurement. The accelerometer pattern measurement indicates a level of movement of the device 103. The accelerometer pattern measurement may be correlated to a bit error rate (BER) behavior of the device 103 to determine the interference potential as described at block 208.

Some of the characteristics described above in regard to block 202 may also be received by the first electronic communications device 102 and used to determine the interference potential. For example, the time stamps may be used by the electronic communications device 102 to determine whether a part of a transmission of the first and/or second electronic communications device 102, 103 is delayed or skipped. The interference status may also be used in determining the interference potential. Likewise, some of the information described in regard to blocks 204 and 206 may be also be used as the one or more characteristics described above in regard to block 202.

The interference potential is compared to a predetermined interference threshold at block 208. The predetermined interference threshold may be stored locally on the first electronic communications device 102 or retrieved via the network 105. At block 210, the electronic processor 107 determines if the interference potential exceeds the predetermined interference threshold. When the interference potential exceeds the predetermined interference threshold (block 212), the electronic processor 107 performs an action 300 (see FIG. 3) according to the active interference policy 109.

Figure 3:
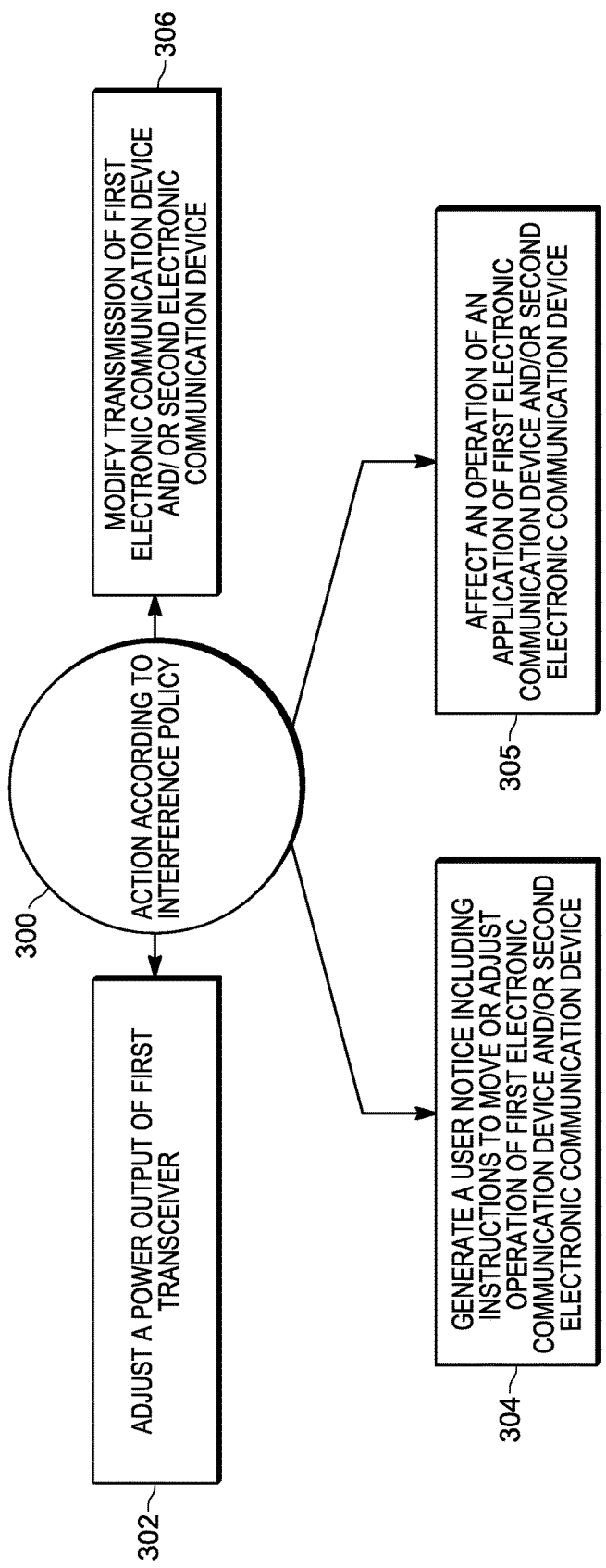
FIG. 3 is a flow chart illustrating the types of the action that may be performed within the method of FIG. 2 in accordance with some embodiments.

FIG. 3 is a flowchart illustrating the types of the action 300 that the electronic processor 107 performs at block 212 of FIG. 2. As illustrated in FIG. 3, the action 300 according to the active interference policy 109 may include adjusting a power output of the first transceiver 116 (block 302), generating a user notice including instructions to move or adjust operation of the first or second electronic communications device 102 or 103 (block 304), affecting an operation of an application present on the first electronic communications device 102 (for example, the application 111) and/or second electronic communications device 103 (block 305), and/or modifying a transmission of the first electronic communications device 102 and/or second electronic communications device 103 (block 306). In some embodiments, more than one of the action 300 and/or types of action 300 may be specified by the active interference policy 109.

Adjusting a power output of the first transceiver 116 is the modification of the level of power used for transmissions of the first transceiver 116. The degree of power adjustment is defined by the active interference policy 109 and may be based on the information received by the second electronic communications device 103. For example, the active interference policy 109 may dictate that when the priority of the first electronic communications device 102 is less than that of the second electronic communications device 103, the power output of the first transceiver 116 is reduced so that the interference experienced by the second electronic communications device 103 is reduced.

The user notice generated by the electronic processor 107 may be one of or both a visual and audible notice. For example, the notice may be a visual notification displayed on the display screen 112. The user notice includes one or more instructions for a user to move or adjust the operation of the first electronic communications device 102 or the second electronic communications device 103 according to the active interference policy 109.

Figure 4:
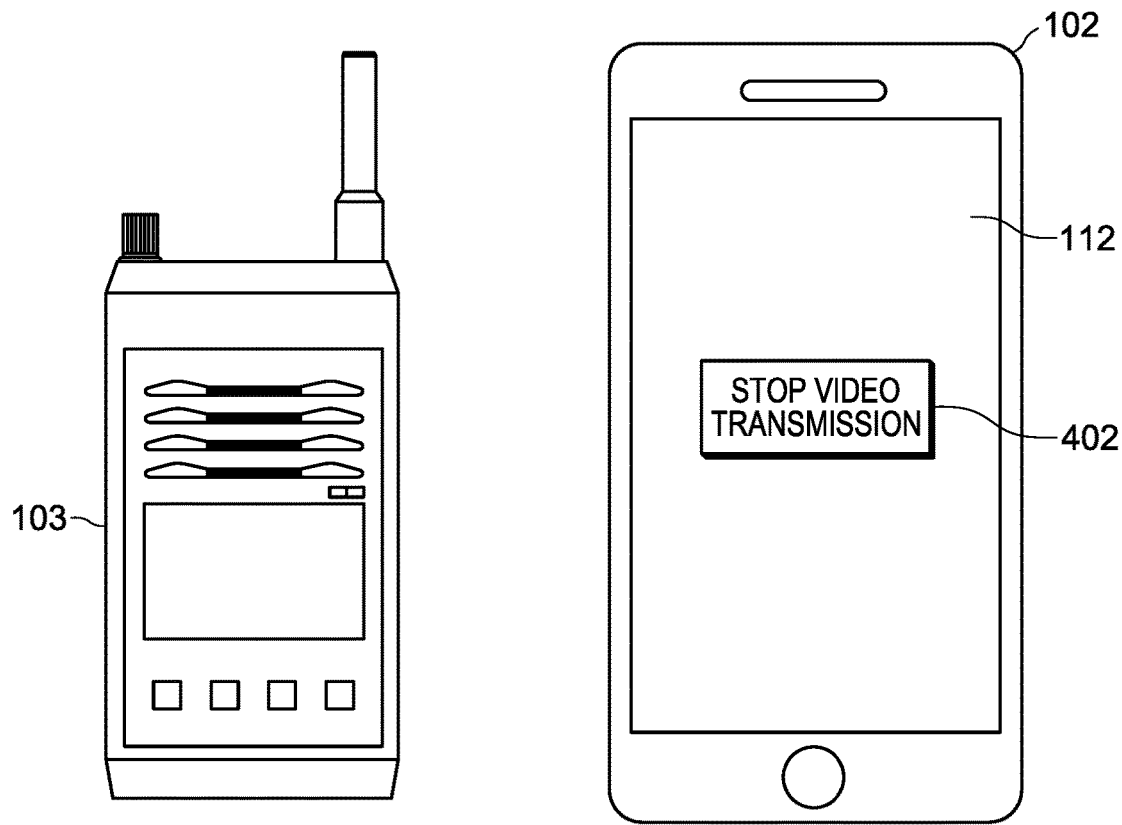
FIG. 4 is a diagram of part of the communications system of FIG. 1 in accordance with some embodiments.

For example, FIG. 4 illustrates the first electronic communications device 102 and the second electronic communications device 103 of the communications system 100. The first electronic communications device 102 may be transmitting video which may interfere with the radio communication performance of the second electronic communications device 103. The active interference policy 109 may cause the electronic processor 107 to generate a user notification 402 on the display screen 112 notifying the user of the electronic communications device 102 to stop the video transmission. In some embodiments, the active interference policy 109 may also include an instruction that the electronic processor 107 automatically stop the video transmission and generate a user notification 402 to the user that the video transmission has been stopped. Alternatively, the active interference policy 109 may instruct the first electronic communications device 102 to transmit a command to the second electronic communications device 103 to generate a user notification 402 on the device 103 notifying the user to stop the radio communication of the device 103 or move the device 103 away from the first electronic communications device 102.

Returning to FIG. 3, affecting the operation of an application present on the first electronic communications device 102 (for example, the application 111) and/or second electronic communications device 103 may include stopping (permanently or for a predetermined amount of time), resuming, or modifying a specific application running on the electronic communications device(s) 102 and 103.

Modification of the transmission of the first or second electronic communications device 102 and 103 may include modifying at least one selected from the group consisting of a transmission technology type, a transmission frequency, a transmission duration, a transmission type, a transmission content type, and a destination of the transmission. In some embodiments, the modification of the transmission includes causing the first or second electronic communications device 102 and 103 to perform cell re-selection in order to avoid the interference. For example, when the first electronic communications device 102 transmits with high power while the second electronic communications device 103 receives very low power signal (received signal strength indicator) from the cell, the active interference policy 109 may cause the second electronic communications device to re-select cells to mitigate/avoid interference.

The transmission technology type is the type of radio communication technology that the first or second electronic communications devices 102 and 103 for the wireless communication. The type of transmission technology used may be modified or changed from one technology to another according to the active interference policy 109. For example, the active interference policy 109 could instruct the electronic processor 107 to stop transmitting over 4G and start transmitting over 3G.

The transmission frequency may be modified or adjusted according to the active interference policy 109. For example, the first electronic communications device 102 may be communicating over a first frequency band and the second electronic communications device 103 may be transmitting over a second frequency band. The first and second frequency band may be close or overlapping, affecting the communication performance of either or both the first and the second electronic communications devices 102 and 103. The active interference policy 109 may cause the electronic processor 107 to communicate over a third frequency band instead of the first frequency band. Alternatively or in addition, the active interference policy 109 may instruct/cause the second electronic communications device to communicate over a different frequency band.

The active interference policy 109 may cause the electronic processor 107 to modify the duration or how long the first electronic communications device 102 transmits for, the content of the transmission, and the destination of the transmissions of the first electronic communications device 102. In some embodiments, the active interference policy 109 instructs the electronic processor 107 change the timing of the transmission, for example from continuous transmission to slotted transmission.

The one or more actions defined by the active interference policy 109 may be performed for as long as the active interference policy 109 is active (before the active interference policy 109 is updated). In some embodiments, one or more of the actions defined by the active interference policy 109 may be performed for a predetermined time or for as long as one or more of a predetermined condition remains true. A predetermined condition is a characteristic of the operation of the first or second electronic communications device 102 and 103. For example, the active interference policy 109 may instruct the electronic processor 107 stop communications of the first electronic communications device 102 while the second electronic communications device 103 is communicating. A predetermined condition may be that the first electronic communications device 102 is in a normal radio mode. While this active interference policy 109 is active for the communications system 100, if the first electronic communications device 102 is placed into an emergency mode, the first electronic communications device 102 may override or force the active interference policy 109 to update so that the first electronic communications device 102 is able to communicate.

In some embodiments, the electronic processor 107 is further configured to verify that one or more of the actions of the active interference policy 109 are implemented. In such an embodiment, the electronic processor 107 may further determine whether to implement one or more additional actions of the active interference policy 109.

Returning to FIG. 2, when the interference potential does not exceed the predetermined interference threshold or after the electronic processor 107 performs block 212, the electronic processor 107 returns to block 202. After the electronic processor 107 returns to block 202, the first electronic communications device 102 determines whether a new or updated interference policy 106 (an interference policy different from the active interference policy 109) is available to be received. In some embodiments, the electronic processor 107 is configured to repeatedly request to the policy server 104 for an updated policy to replace to active interference policy 109. In such embodiments, the electronic processor 107 may be further configured to transmit the updated policy to the second electronic communications device 103.

In some embodiments, the policy server 104 is configured to update the interference policy 106 according to one or more update conditions, creating an updated interference policy 106 to replace the active interference policy 109. The update condition may be defined by one or more of a priority type, a priority action type, and a priority action dependency. The priority type is used to characterize the type of electronic communications device and/or its communications to. For example, a priority type may be a service, a technology (the type of communication modality), a group identification, or an international mobile subscriber identity (IMSI). The priority action type is the type of action to be taken according to the active interference policy 109. For example, an action type may include generating a notice or instruction to a user, stopping or ignoring a communication, and the like. A priority action dependency further defines the situation where the active interference policy 109 is implemented. The action dependency may include at least one of a type of interference, interfered frequency bands, a type of technology, a type of service, a type of group, and one or more of the characteristics described in regard to block 202. The action dependency may be applied to one or more priority types and/or priority action types. For example, the active interference policy 109 may cause one or more action types to be performed by a service group priority type when the service group is using LMR. In some embodiments, the active interference policy 109 is updated when a communication device is added or removed from the communications system 100, after a predetermined period of time has elapsed, or according to or the one or more characteristics described above in regard to block 202.

It should be noted that a plurality of hardware and software based devices, as well as a plurality of different structural components may be utilized to implement the invention. In some embodiments, the invention provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An electronic communications device comprising:
   a first transceiver;
   a second transceiver;
   an electronic processor connected to the first transceiver and the second transceiver and configured to
   receive an interference policy;
   receive, via the second transceiver, information from a second electronic communications device;
   determine, based on the information, an interference potential between the electronic communications device and the second electronic communications device;
   compare the interference potential to a predetermined interference threshold;
   in response to the interference potential exceeding the predetermined interference threshold, perform at least one action according to the interference policy, the at least one action selected from the group consisting of adjusting a power output of the first transceiver, generating a user notice including instructions to move or adjust an operation of either one or both of the electronic communications device and the second electronic communications device, affecting an operation of an application present on either one or both of the electronic communications device and the second electronic communications device, and modifying a transmission of either one or both of the electronic communications device and the second electronic communications device; and
   receive, from a remote server, an updated interference policy to replace the active interference policy,
   wherein the updated interference policy is created according to an update condition defined by at least one selected from the group consisting of a priority type, an action type, and an action dependency.

2. The electronic communications device of claim 1, wherein receiving the interference policy includes at least one selected from the group consisting of receiving, via the first transceiver, the interference policy from the remote server, receiving, via the second transceiver, the interference policy from the second electronic communications device, and downloading the interference policy from a flash memory.

3. The electronic communications device of claim 2, wherein the electronic processor is further configured to repeatedly request the updated interference policy from the remote server.

4. The electronic communications device of claim 1, wherein the electronic processor is further configured to transmit the interference policy to the second electronic communications device.

5. The electronic communications device of claim 1, wherein the interference potential is determined based on at least one selected from the group consisting of a multicast control channel frequency, a multicast control channel duplex spacing, a traffic channel frequency, and a traffic channel duplex spacing.

6. The electronic communications device of claim 1, wherein modifying the transmission of either one or both of the electronic communications device and the second electronic communications device includes modifying at least one selected from the group consisting of a transmission technology type, transmission frequency, transmission duration, transmission type, transmission content type, and a destination of the transmission.

7. A method of mitigating inter-device interference on an electronic communications device including a first transceiver and a second transceiver, the method comprising:
   receiving an interference policy;
   receiving, via a second transceiver, information from a second electronic communications device;
   determining, based on the information and with an electronic processor of the electronic communications device, an interference potential between the electronic communications device and the second electronic communications device;
   comparing, via the electronic processor, the interference potential to a predetermined interference threshold;
   in response to the interference potential exceeding the predetermined interference threshold, performing, with the electronic processor, at least one action according to the interference policy, the at least one action selected from the group consisting of adjusting a power output of the first transceiver, generating a user notice including instructions to move or adjust an operation of either one or both of the electronic communications device and the second electronic communications device, affecting an operation of an application present on either one or both of the electronic communications device and the second electronic communications device, and modifying a transmission of either one or both of the electronic communications device and the second electronic communications device; and
   receiving, from a remote server, an updated interference policy to replace the active interference policy,
   wherein the updated interference policy is created according to an update condition defined by at least one selected from the group consisting of a priority type, an action type, and an action dependency.

8. The method of mitigating inter-device interference of claim 7, wherein receiving the interference policy includes at least one selected from the group consisting of receiving, via the first transceiver, the interference policy from the remote server, receiving, via the second transceiver, the interference policy from the second electronic communications device, and downloading the interference policy from a flash memory.

9. The method of mitigating inter-device interference of claim 8, further comprising repeatedly requesting the updated interference policy from the remote server.

10. The method of mitigating inter-device interference of claim 7, further comprising transmitting the interference policy to the second electronic communications device.

11. The method of mitigating inter-device interference of claim 7, wherein the interference potential is determined based on at least one of a multicast control channel frequency, a multicast control channel duplex spacing, a traffic channel frequency, and a traffic channel duplex spacing.

12. The method of mitigating inter-device interference of claim 7, wherein modifying the transmission of either one or both of the electronic communications device and the second electronic communications device includes modifying at least one selected from the group consisting of a transmission technology type, a transmission frequency, a transmission duration, a transmission type, a transmission content type, and a destination of the transmission.

13. An inter-device interference mitigation system comprising:
    an electronic communications device; and
    a server configured to store an interference policy and transmit the interference policy to the electronic communications device;
    wherein the electronic communications device includes
        a first transceiver;
        a second transceiver; and
        an electronic processor connected to the first transceiver and second transceiver and configured to
            receive the interference policy;
            receive, via the second transceiver, information from a second electronic communications device;
            determine, based on the information, an interference potential;
            compare the interference potential to a predetermined interference threshold;
            in response to the interference potential exceeding the predetermined interference threshold, perform at least one action according to the interference policy, the at least one action selected from the group consisting of adjusting a power output of the first transceiver, generating a user notice including instructions to move or adjust an operation of either one or both of the electronic communications device and the second electronic communications device, affecting an operation of an application present on either one or both of the electronic communications device and the second electronic communications device, and modifying a transmission of either one or both of the electronic communications device and the second electronic communications device; and
            receive, from a remote server, an updated interference policy to replace the active interference policy,
    wherein the updated interference policy is created according to an update condition defined by at least one selected from the group consisting of a priority type, an action type, and an action dependency.

14. The inter-device interference mitigation system of claim 13, wherein receiving the interference policy includes at least one selected from the group consisting of receiving, via the first transceiver, the interference policy from the remote server, receiving, via the second transceiver, the interference policy from the second electronic communications device, and downloading the interference policy from a flash memory.

15. The inter-device interference mitigation system of claim 14, wherein the electronic processor is further configured to repeatedly request the updated interference policy from the remote server.

16. The inter-device interference mitigation system of claim 13, wherein the electronic processor is further configured to transmit the interference policy to a second electronic communications device.

17. The inter-device interference mitigation system of claim 13, wherein the interference potential is determined based on at least one of a multicast control channel frequency, a multicast control channel duplex spacing, a traffic channel frequency, and a traffic channel duplex spacing.

18. The inter-device interference mitigation system of claim 13, wherein modifying the transmission of either one or both of the electronic communications device and the second electronic communications device is based on at least one selected from the group consisting of a transmission technology type, a transmission frequency, a transmission duration, a transmission type, a transmission content type, and a destination of the transmission.

* * * * *